United States Patent
Marks et al.

(10) Patent No.: US 10,586,628 B2
(45) Date of Patent: *Mar. 10, 2020

(54) ALUMINUM METALLIC NANOPARTICLE-POLYMER NANOCOMPOSITES FOR ENERGY STORAGE

(71) Applicants: Northwestern University, Evanston, IL (US); The Penn State Research Foundation, University Park, PA (US)

(72) Inventors: Tobin J. Marks, Evanston, IL (US); Michael T. Lanagan, State College, PA (US); Mark A. Ratner, Glencoe, IL (US); Massimiliano Delferro, Chicago, IL (US); Lisa A. Fredin, Austin, TX (US); Zhong Li, New Albany, OH (US)

(73) Assignees: Northwestern University, Evanston, IL (US); The Penn State Research Foundation, University Park, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/853,825

(22) Filed: Sep. 14, 2015

(65) Prior Publication Data

US 2016/0071627 A1 Mar. 10, 2016

Related U.S. Application Data

(60) Continuation of application No. 13/840,115, filed on Mar. 15, 2013, now abandoned, which is a
(Continued)

(51) Int. Cl.
*H01B 3/30* (2006.01)
*H01B 3/10* (2006.01)
(Continued)

(52) U.S. Cl.
CPC ............ *H01B 3/307* (2013.01); *B82Y 30/00* (2013.01); *C08F 10/00* (2013.01); *C08F 110/06* (2013.01);
(Continued)

(58) Field of Classification Search
CPC .......... B82Y 30/00; H01G 4/206; H01G 4/18; H01G 4/10; C08F 10/00; C08F 110/06;
(Continued)

(56) References Cited

U.S. PATENT DOCUMENTS 6,465,543 B1 10/2002 Alexandre et al.
2002/0004556 A1 1/2002 Foulger et al.
(Continued)

OTHER PUBLICATIONS

Brosseau et al. How do shape anisotropy and spatial orientation of the constituents affect the permittivity of dielectric heterostructures? Journal of Applied Physics 88, 7278-7288 (2000).*
(Continued)

*Primary Examiner* — Robert S Walters, Jr.
(74) *Attorney, Agent, or Firm* — Bell & Manninng, LLC

(57) ABSTRACT

A nanoparticle composition comprising a substrate comprising a metal oxide component and an aluminum oxide component; and a metallocene olefin polymerization catalyst component coupled to the substrate is disclosed. The metal oxide component is homogenously dispersed throughout the nanocomposite composition.

16 Claims, 16 Drawing Sheets

Figure 1:
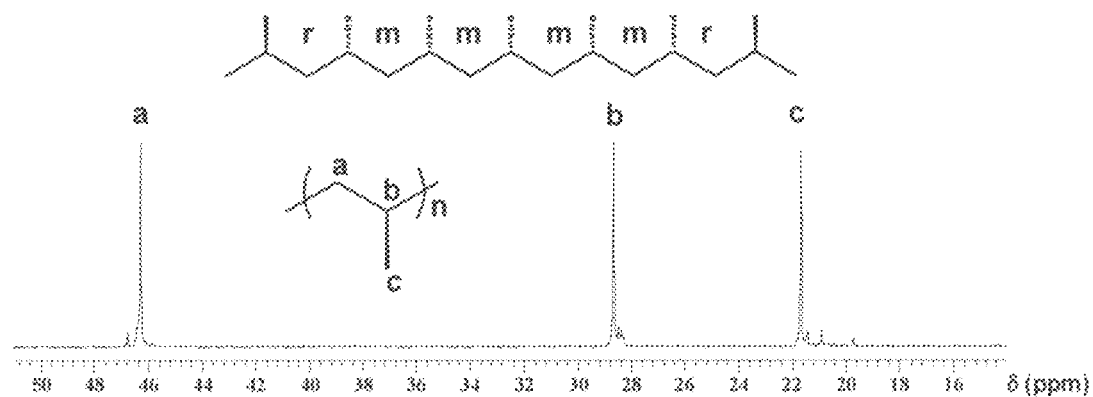

Scheme 1.

Scheme 2.

Related U.S. Application Data continuation-in-part of application No. 13/449,750, filed on Apr. 18, 2012, now Pat. No. 8,729,182, which is a division of application No. 11/985,930, filed on Nov. 19, 2007, now Pat. No. 8,163,347.

(60) Provisional application No. 60/859,873, filed on Nov. 17, 2006.

(51) Int. Cl.

| | | |
|---|---|---|
| *C08K 9/02* | (2006.01) | |
| *C08F 110/06* | (2006.01) | |
| *C08F 10/00* | (2006.01) | |
| *B82Y 30/00* | (2011.01) | |
| *C09C 1/64* | (2006.01) | |
| *H01G 4/18* | (2006.01) | |
| *H01G 4/20* | (2006.01) | |
| *C08F 4/6592* | (2006.01) | |
| *C08F 4/659* | (2006.01) | |
| *C08K 3/22* | (2006.01) | |
| *C08K 3/08* | (2006.01) | |
| *H01G 4/10* | (2006.01) | |

(52) U.S. Cl.
CPC ............... *C08K 9/02* (2013.01); *C09C 1/648* (2013.01); *H01B 3/10* (2013.01); *H01G 4/18* (2013.01); *H01G 4/206* (2013.01); *C01P 2002/86* (2013.01); *C01P 2004/51* (2013.01); *C01P 2006/40* (2013.01); *C08F 4/6592* (2013.01); *C08F 4/65912* (2013.01); *C08F 4/65927* (2013.01); *C08K 2003/0812* (2013.01); *C08K 2003/2227* (2013.01); *C08K 2003/2241* (2013.01); *C08K 2201/011* (2013.01); *H01G 4/10* (2013.01)

(58) Field of Classification Search
CPC .. C08F 4/025; C08F 4/65916; C08F 4/65912; C08F 4/6592; C08F 4/6592; C08F 4/65927; C08F 2500/15; C08K 9/02; C08K 2201/011; C08K 2003/2241; C08K 2003/2227; C08K 2003/0812; H01B 3/10; H01B 3/307; C09C 1/648; C08L 23/12; C01P 2002/86; C01P 2004/51; C01P 2006/40
See application file for complete search history.

(56) References Cited

U.S. PATENT DOCUMENTS

| | | |
|---|---|---|
| 2004/0105810 A1 | 6/2004 | Ren et al. |
| 2004/0152591 A1 | 8/2004 | Jin et al. |
| 2004/0198888 A1 | 10/2004 | Gash et al. |
| 2005/0049140 A1 | 3/2005 | Holtcamp |
| 2005/0136292 A1 | 6/2005 | Mariani et al. |
| 2005/0165183 A1 | 7/2005 | McCullough et al. |
| 2006/0122308 A1 | 6/2006 | Wermter et al. |

OTHER PUBLICATIONS

Kaminsky et al. "Polymerization of Propene and Butene with a Chiracl Zirconocene and Methylalumoxane as Cocatalyst" Angew. Chem. Int. Ed. Engl. 24 (1985) vol. 6, pp. 507-508.

Steinmetz et al. "Polypropylene growth on silica-supported metallocene catalysts: A micoscopic study to explain kinetic behavior especially in early polymerization stages" Acta Polymerica vol. 48, Issue 9 Mar. 11, 2003.

Xalter et al. "Online Monitoring of Polyolefin Particle Growth in Catalytic Olefin Slurry Polymerization by Means of Lasentec Focused Beam Reflectance Measurement (FBRM) and Video Microscopy (PVM) Probes" Macromolecular Reaction Engineering 2010 4, 25-39.

Fredin et al., "Substantial Recoverable Energy Storage in Percolative Metallic Aluminum-Polypropylene Nanocomposites", Adv. Funct. Mater. Feb. 7, 2013, 23, 3560-3569.

U.S. Appl. No. 13/840,115, filed Mar. 15, 2013.
U.S. Appl. No. 13/449,750, filed Apr. 18, 2012.
U.S. Appl. No. 11/985,930, filed Nov. 19, 2007.

\* cited by examiner

Octene% = 25.0%

Figure 4
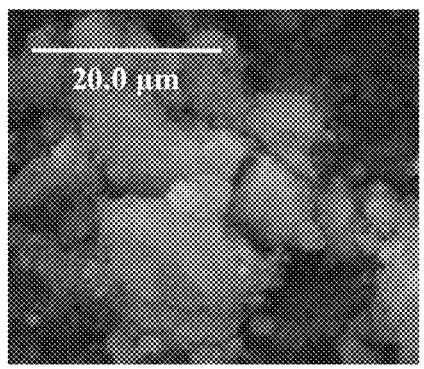
Figure 4A
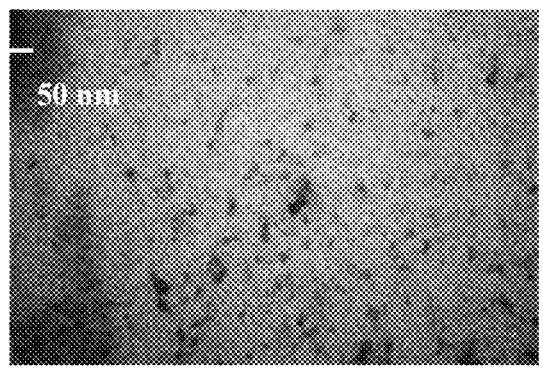
Figure 4B

Figure 5
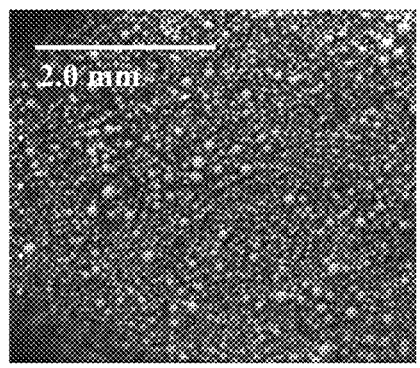
Figure 5A
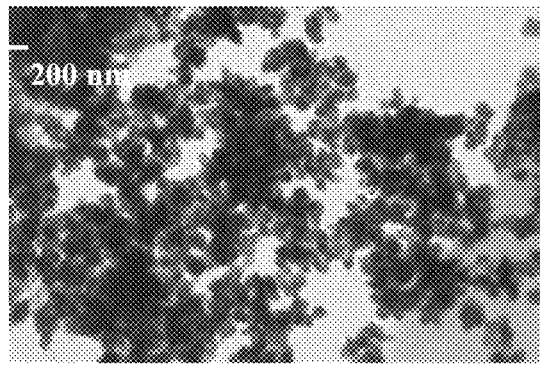
Figure 5B

Figure 6
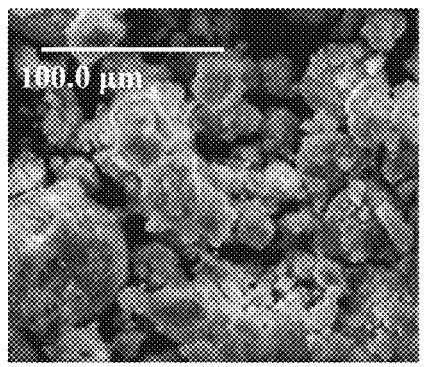
Figure 6A
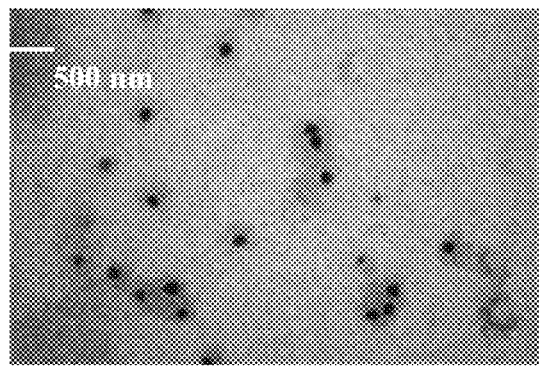
Figure 6B

Figure 8
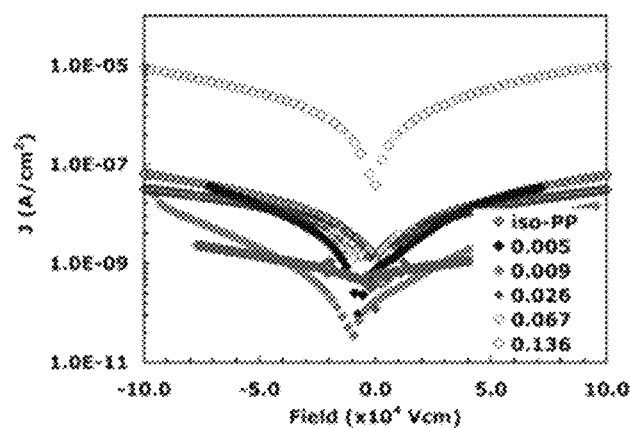
Figure 8A
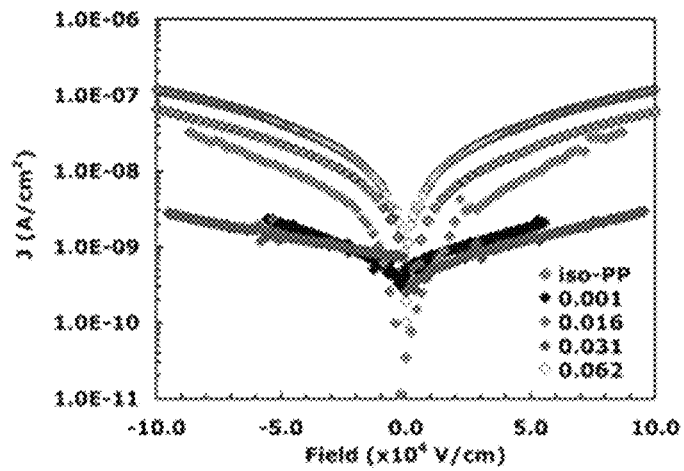
Figure 8B
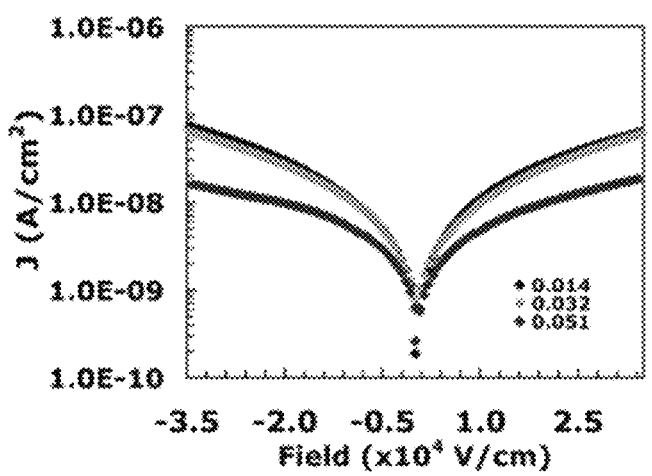
Figure 8C

Figure 9
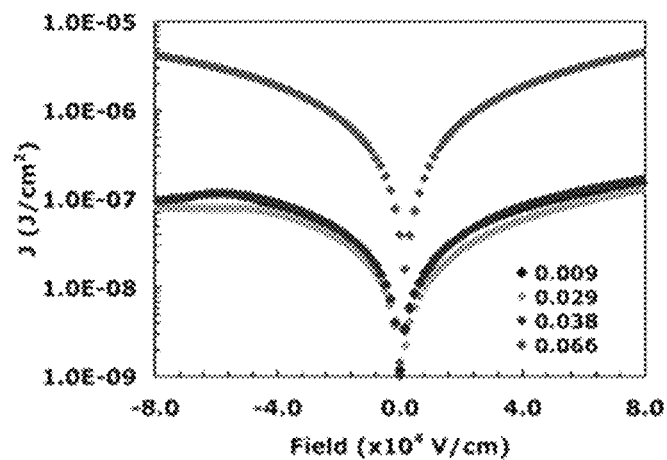
Figure 9A
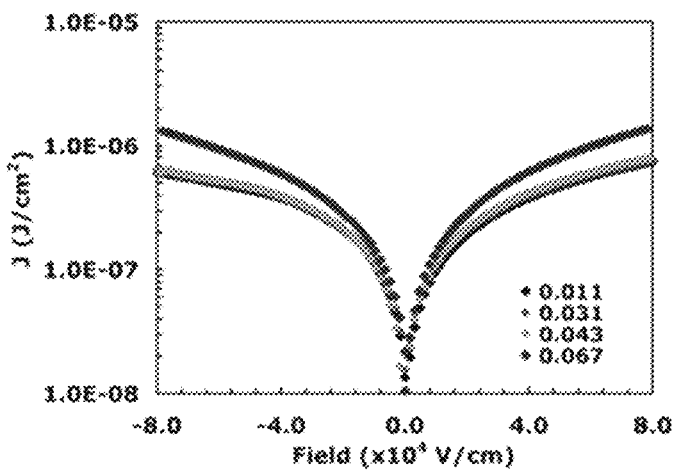
Figure 9B
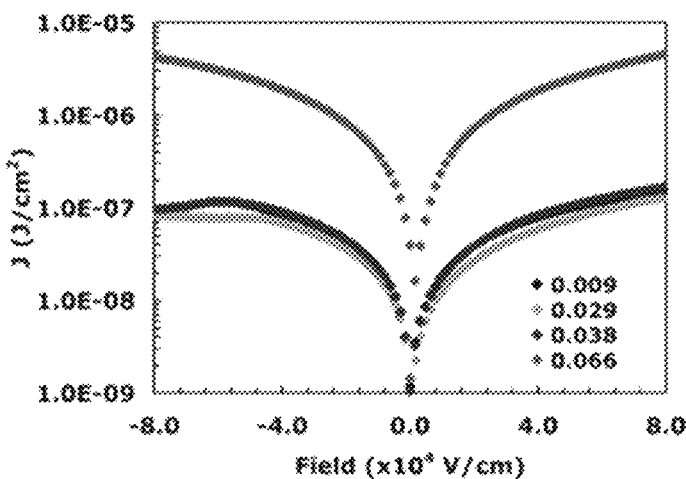
Figure 9C

Figure 14
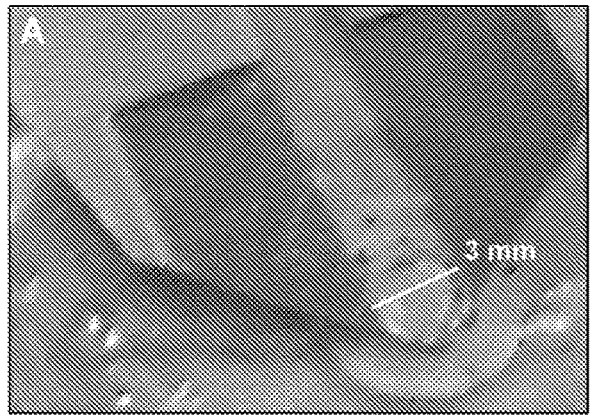
Figure 14A
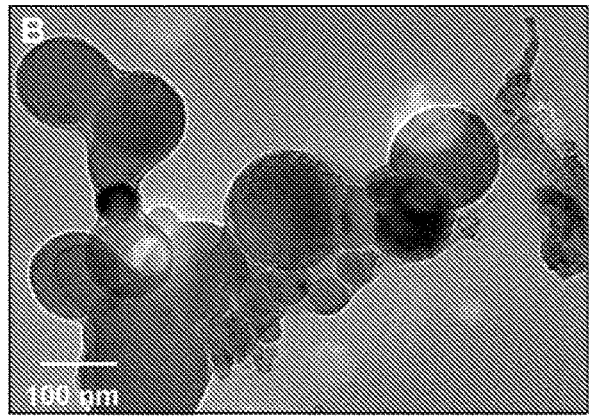
Figure 14B
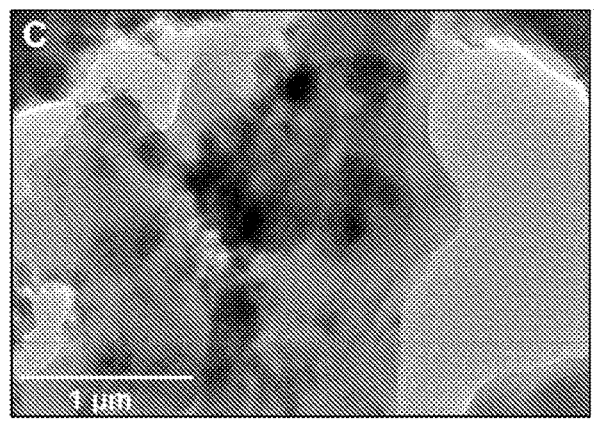
Figure 14C
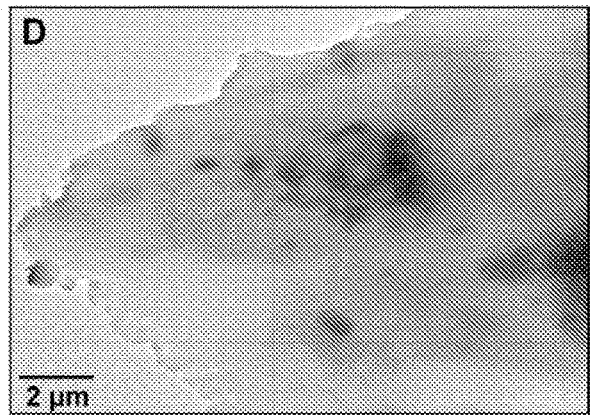
Figure 14D
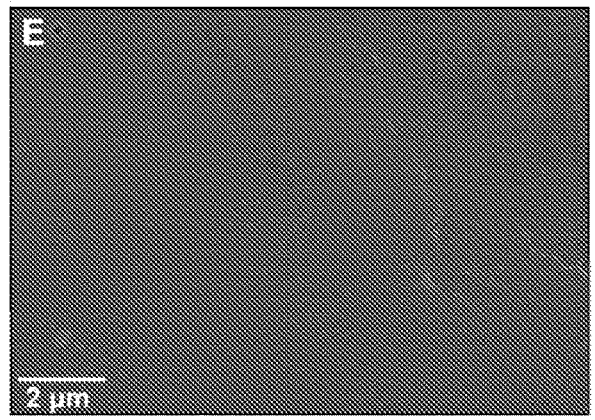
Figure 14E
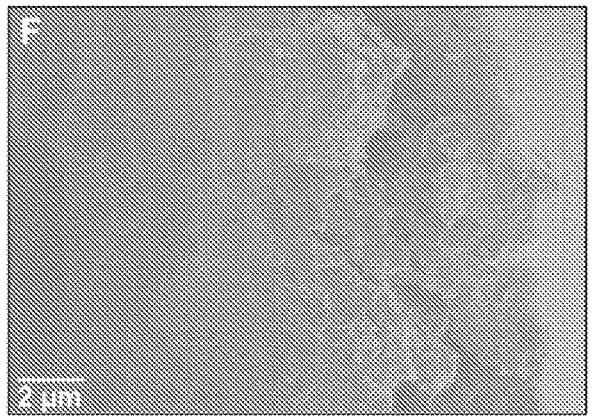
Figure 14F Chart 1

EBIZrCl₂      CGCTiCl₂      Cp*TiCl₃      MAO

*Scheme 1.*

*Scheme 2.*

ALUMINUM METALLIC NANOPARTICLE-POLYMER NANOCOMPOSITES FOR ENERGY STORAGE

This application is a continuation of and claims priority to and the benefit of application Ser. No. 13/840,115 filed Mar. 15, 2013, which was a continuation-in-part of and claimed priority to and the benefit of application Ser. No. 13/449,750 filed Apr. 18, 2012 and issued as U.S. Pat. No. 8,729,182 on May 20, 2014, which was a divisional of and claimed priority to and the benefit of application Ser. No. 11/985,930 filed Nov. 19, 2007 and issued as U.S. Pat. No. 8,163,347, which claimed priority to and the benefit of application Ser. No. 60/859,873 filed on Nov. 17, 2006—each of which is incorporated herein by reference in its entirety.

This invention was made with government support under N00014-05-1-0541 awarded by the Office of Naval Research; DE-FG02-86ER13511 awarded by the Department of Energy; and DMR1121262 awarded by the National Science Foundation. The government has certain rights in the invention.

BACKGROUND OF THE INVENTION

Future pulsed-power and power electronic capacitors will require dielectric materials ultimately having energy storage densities >30 J/cm$^3$, with operating voltages >10 kV, and msec-µsec charge/discharge times with reliable operation near the dielectric breakdown limit. Importantly, at 2 J/cm$^3$ and 0.2 J/cm$^3$, respectively, the operating characteristics of current state-of-the-art pulsed power and power electronic capacitors, which utilize either ceramics or polymers as dielectric materials, remain significantly short of this goal. An order of magnitude improvement in energy density will require development of revolutionary new materials that substantially increase intrinsic dielectric energy densities while operating reliably near the dielectric breakdown limit. For simple linear response dielectric materials, energy density is defined in eq. 1, where $\varepsilon_r$ is relative dielectric permittivity, E is the dielectric breakdown strength, and $\varepsilon_0$ is the vacuum permittivity. Generally, inorganic metal oxides exhibit high permittivities, however, they suffer from low breakdown fields. While organic materials (e.g., polymers) can provide high breakdown strengths, their generally low permittivities have limited their application.

$$U_e = \tfrac{1}{2}\varepsilon_r \varepsilon_0 E^2 \quad (1)$$

Recently, inorganic-polymer nanocomposite materials have attracted great interest due to their potential for high energy density. By integrating the complementary properties of their constituents, such materials can simultaneously derive high permittivity from the inorganic inclusions and high breakdown strength, mechanical flexibility, facile processability, light weight, and properties tunability (molecular weight, comonomer incorporation, thermal properties, etc.) from the polymer host matrix. Additionally, there are good reasons to believe that the large inclusion-matrix interfacial areas will afford higher polarization levels, dielectric response, and breakdown strength.

Although inorganic-polymer nanocomposites can be prepared via mechanical blending, solution mixing, in situ radical polymerization, and in situ nanoparticle synthesis, host-guest incompatibilities frequently result in nanoparticle aggregation and phase separation, detrimental to the electrical properties. Covalently grafting polymer chains to inorganic nanoparticle surfaces has also proven promising, leading to more effective dispersion and enhanced properties, however, such processes may not be cost-effective and nor easily scaled up.

Illustrating another approach, in the large-scale heterogeneous or slurry olefin polymerizations practiced on a huge industrial scale, SiO$_2$ is generally used as the catalyst support. However, very large local hydraulic pressures arising from the growing polyolefin chains are known to effect extensive SiO$_2$ particle fracture and lead to SiO$_2$-polyolefin composites. As a result, there remains an on-going search in the art for an alternate route to inorganic-polymer nanocomposites, to better utilize the benefits and advantages afforded by such materials.

SUMMARY OF THE INVENTION

In light of the foregoing, it is an object of the present invention to provide various high energy nanocomposites, related components and devices, and/or methods for their preparation and/or assembly, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all of its respects, to every aspect of this invention. As such, the following objects can be viewed in the alternative with respect to any one aspect of this invention.

It can be an object of the present invention to provide one or more methods for nanocomposite preparation to prevent nanoparticle agglomeration problems associated with the prior art.

It can be another object of the present invention to provide an in situ polymerization technique using one or more metallocene catalyst components supported on a nanoparticle, with a range of available olefin monomers.

It can be another object of the present invention, alone or in conjunction with one of the preceding objectives, to provide a nanocomposite comprising a nanoparticle component homogeneously dispersed within a matrix of a high-strength, high-energy commodity polymer material of the sort used in the art with energy storage capacitors and insulators.

Other objects, features, benefits and advantages of the present invention will be apparent from this summary and the following descriptions of certain embodiments, and will be readily apparent to those skilled in the art having knowledge of various high energy nanocomposites and assembly/production techniques. Such objects, features, benefits and advantages will be apparent from the above as taken into conjunction with the accompanying examples, data, figures and all reasonable inferences to be drawn therefrom, alone or with consideration of the references incorporated herein.

In part, the present application can be directed to a particulate composition comprising a substrate comprising a metal oxide component and an aluminum oxide component; and a metallocene olefin polymerization catalyst component coupled to such a substrate. Without limitation, such a substrate and/or particulate can be nano-dimensioned. In certain other embodiments, such a substrate and/or particulate composition can be micro-dimensioned.

In certain embodiments, a metal oxide can be but is not limited to binary and ternary metal oxides, such oxides as can comprise a dopant, and combinations thereof. In certain such embodiments, a metal oxide component can be selected from Al$_2$O$_3$, SiO$_2$, TiO$_2$, ZrO$_2$, BaTiO$_3$ BaZrO$_3$, PbO$_3$, together with Pb(TiZr)O$_3$ and other such oxides comprising a dopant. Regardless, a metallocene component can be selected from any such polymerization catalyst known to those skilled in the art, made aware of this invention. Without limitation, such a metallocene component can be selected from $EBIZrCl_2$, $CGCTiCl_2$ and $CpTiCl_3$, as described more fully below, and structural variations thereof. Without limitation as to metal oxide and metallocene identity, such a composition can be provided in a polyolefin matrix.

In part, the present invention can also be directed to a composite comprising a nano-dimensioned substrate comprising a metal oxide component, an aluminum oxide component and a metallocene catalyst component; and a polyolefin component coupled thereto. In certain embodiments, a polyolfin component can be selected from $C_2$ to about $C_{12}$ polyalkylenes, substituted $C_2$ to about $C_{12}$ polyalkylenes, and copolymers thereof, such polyolefin components limited only by alkylene monomer (s) reactive with such a metallocene catalyst component under polymerization conditions of the sort described herein. In certain such embodiments, metallocene and metal oxide components can be as described above or illustrated elsewhere herein. Accordingly, with choice of alkylene monomer(s), such a polyolefin component can be select from isotactic polypropylene, a linear polyethylene, and a polystyrene and copolymers thereof.

In part, the present invention can also be directed to a commodity or bulk material composition comprising a polyolefin component and a nano-dimensioned or micro-dimensioned substrate component dispersed therein, with such a substrate component comprising a metal oxide component, an aluminum oxide component and metallocene catalyst component. Such metal oxide, aluminum oxide and metallocene components can be as described above. Without limitation as to substrate identity, volume fractions or percentages can range from about 0.05 percent to about 15 percent. Likewise, substrate dispersion can be substantially homogeneous on a nano- or microscale dimension. In certain such embodiments, a metal oxide component of such a substrate can have a shape about or substantially spherical or a shape about or substantially rod-like, as demonstrated below.

A polyolefin component of such a composition is limited only by monomer polymerization in the presence in such a metallocene catalyst. For instance, in certain embodiments, a polyolefin can be selected from $C_2$ to about $C_{12}$ polyalkylenes, substituted $C_2$ to about $C_{12}$ polyalkylenes, and copolymers thereof. Regardless, depending upon polyolefin and/or substrate component identity, such a composition can be present as a thin film and/or incorporated into a range of device structures, including but not limited to insulator devices. Alternatively, depending upon a particular composition, such materials can find utility in the context of cable insulation.

In part, the present invention can also be directed to a method of preparing a metal oxide-polyolefin nanocomposite. Such a method can comprise providing a substrate comprising a metal oxide component and a metallocene olefin polymerization catalyst component coupled thereto; and contacting such a substrate with an olefin component, such contact for a time and/or an amount sufficient to at least partially polymerize an olefin on such a substrate, to provide a nanocomposite. Without limitation, metal oxide, metallocene and/or olefin/alkylene components can be selected as described above. Depending upon olefin content and degree of polymerization, such a substrate component can have a volume percentage ranging from about 0.05 percent to about 15 percent. In certain, embodiments, increasing volume percent can be used to affect melt temperature, leak current density and/or relative permittivity of a resulting nanocomposite. In certain other embodiments, choice of metal oxide shape can be used to affect one or more composite physical characteristics. Without limitation, the relative permittivity of such a nanocomposite can be increased using a rod-shaped metal oxide component.

Illustrating yet another aspect thereof, the present invention can be directed to a method of using an aluminoxane component to moderate phase energy densities of a metal oxide-polyolefin composite. Such a method can comprise providing a metal oxide component as can be selected from binary and ternary metal oxides and such oxides comprising a dopant; contacting such a metal oxide component with an aluminoxane component for a time at least partially sufficient to provide an aluminum oxide coating on the metal oxide component; contacting such a coated metal oxide with a metallocene olefin polymerization catalyst component, to provide a nano- or micro-dimensioned substrate of the sort described above; and contacting such substrate with one or more olefin components, such contact for a time and/or an amount sufficient to at least partially polymerize the olefin(s) on such a substrate.

DETAILED DESCRIPTION OF THE DRAWINGS

FIG. 1. $^{13}C$ NMR spectrum of an isotactic-polypropylene nanocomposite (100 MHz, $C_2D_2Cl_4$, 130° C.).

Figure 2:
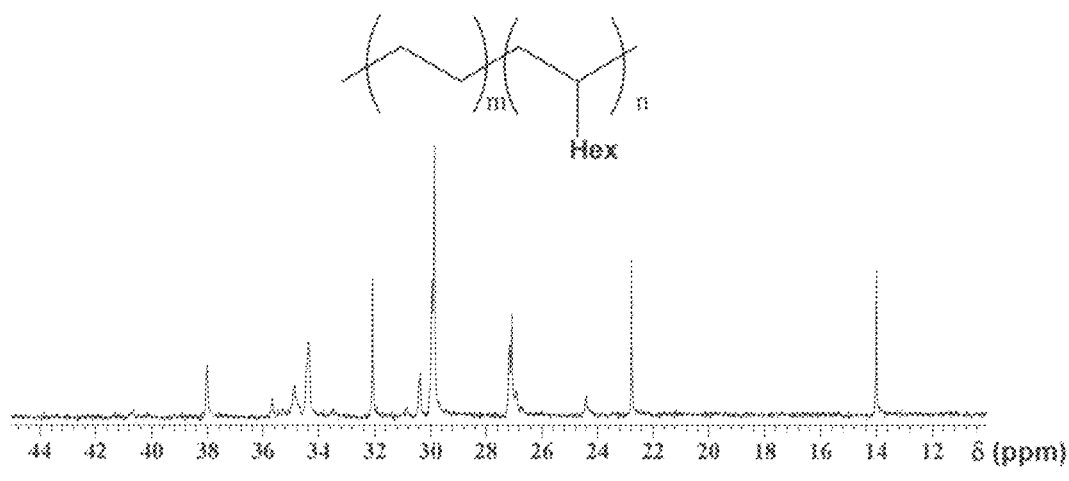

FIG. 2. $^{13}C$ NMR spectrum of a poly(ethylene-co-1-octene) nanocomposite (100 MHz, $C_2D_2Cl_4$, 130° C.).

Figure 3:
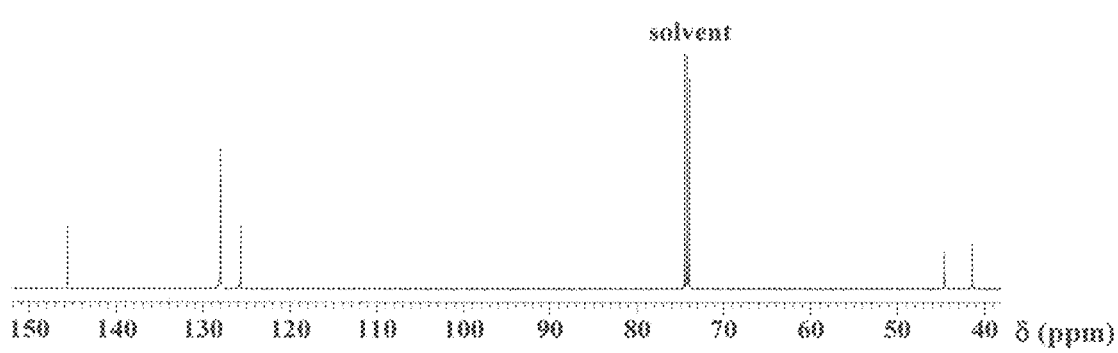

FIG. 3. $^{13}C$ NMR spectrum of a syndiotactic-polystyrene nanocomposite (100 MHz, $C_2D_2Cl_4$, 130° C.).

FIGS. 4A-B. Electron microscopic characterization of: (A) as-received pristine $ZrO_2$ (SEM) and (B) 7.4 vol % $ZrO_2$-$^{iso}$PP nanocomposite (TEM).

FIGS. 5A-B. Electron microscopic characterization of: (A) as-received pristine TZ3Y (SEM) and (B) 31.1 wt % TZ3Y-$^{iso}$PP nanocomposite (TEM).

FIGS. 6A-B. Electron microscopic characterization of: (A) as-received pristine TZ8Y (SEM) and (B) 39.2 wt % TZ8Y-$^{iso}$PP nanocomposite (TEM).

Figure 7:
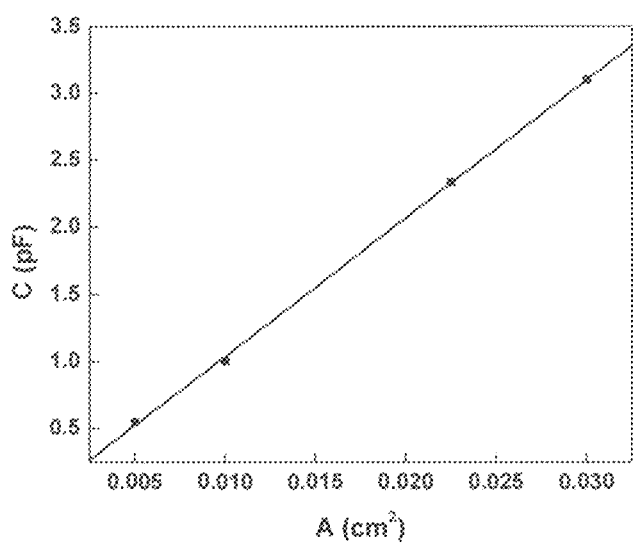

FIG. 7. Representative C (capacitance) vs. A (electrode area) plot for a 2.6 vol % $BaTiO_3$-$^{iso}$PP nanocomposite.

FIGS. 8A-C. Leakage current density vs. field measurement results for the nanocomposite MIS or MIM devices (legends are for the volume fraction of the inorganic particles): (A) $n^+$-Si/$BaTiO_3$-polypropylene/Au; (B) $n^+$-Si/sphere-$TiO_2$-polypropylene/Au; (C) Al/rod-$TiO_2$-polypropylene/Au.

FIGS. 9A-C. Leakage current density vs. field measurement results for the nanocomposite MIS or MIM devices (legends are for the volume fraction of the inorganic particles): (A) Al/$ZrO_2$-polypropylene/Au; (B) Al/TZ3Y-polypropylene/Au; (C) Al/TZ8Y-polypropylene/Au.

Figure 10:
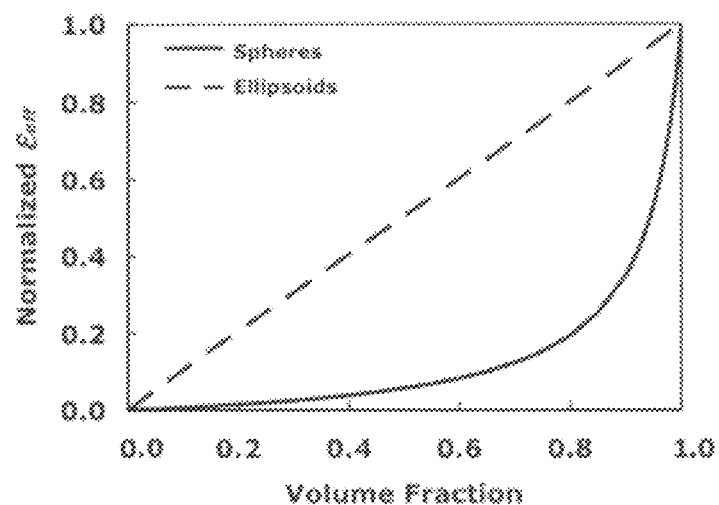

FIG. 10. Normalized effective permittivity ($\varepsilon_{eff}$-$\varepsilon_b$/$\varepsilon_a$-$\varepsilon_b$) for composite dielectrics of polypropylene with spherical inclusions (eq. 6), and with ellipsoidal inclusions (eq. 7).

Figure 11:
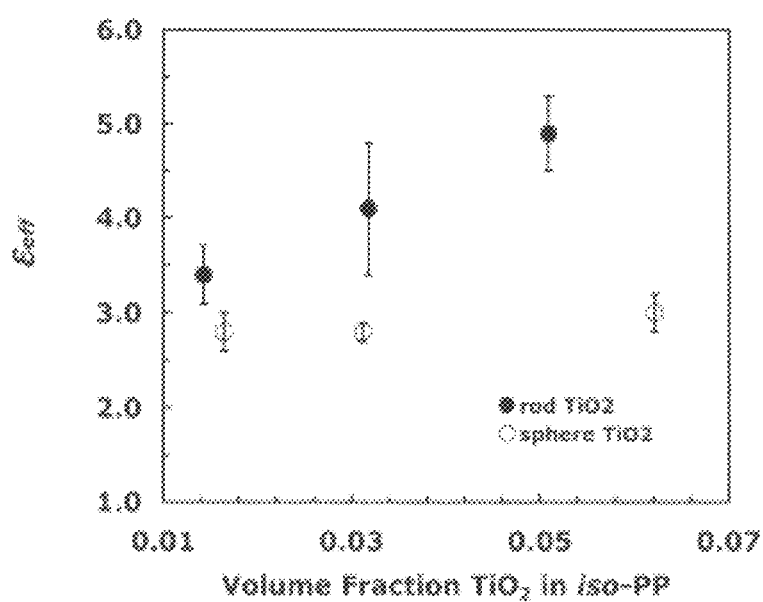

FIG. 11. Comparison of effective permittivities for spherical- and rod-shaped $TiO_2$ nanoparticle-polypropylene nanocomposites.

Figure 12:
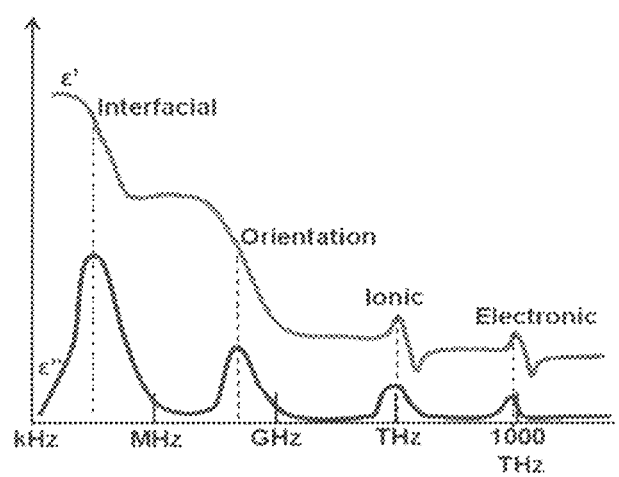

FIG. 12. Real ($\varepsilon'$) and imaginary($\varepsilon''$) parts of the complex permittivity for a material having interfacial, orientational, ionic, and electronic polarization.

Figure 13:
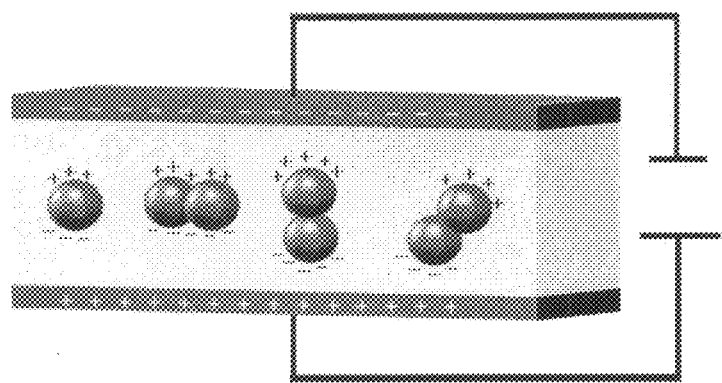

FIG. 13. Depiction of possible orientations of an aligned two-particle aggregate compared to a single isolate particle when an applied voltage induces charges on each of the electrodes; the corresponding polarization of the particles within the matrix results in charge accumulation at the particle surface, wherein the response of these charges to the oscillating field is the Maxwell-Wagner-Sillars (MWS) polarization.

FIGS. 14A-F. (A) Photograph of a thick film prepared in a PET washer, and TEM of (B) Al nanoparticles after washing, (C) as fabricated composite powder and (D) melt-processed composite powder of the 0.104 $v_f$ composite where the dark spots are nanoparticles; as well as, SEM characterization of a 0.104 $v_f$ composite (E) thick film surface and (F) thin film torn edge.

Figure 15:
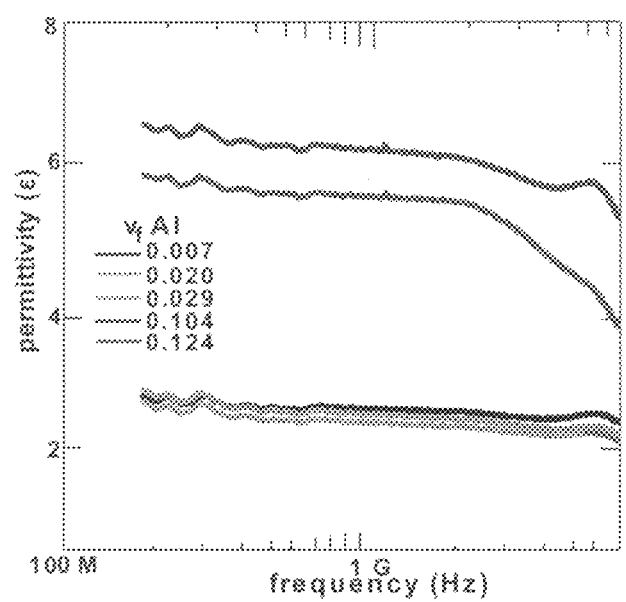

FIG. 15. Permittivity of Al-$^{iso}$PP nanocomposites from 100 MHz to 7 GHz as a function of Al nanoparticle volume fraction.

Figure 16:
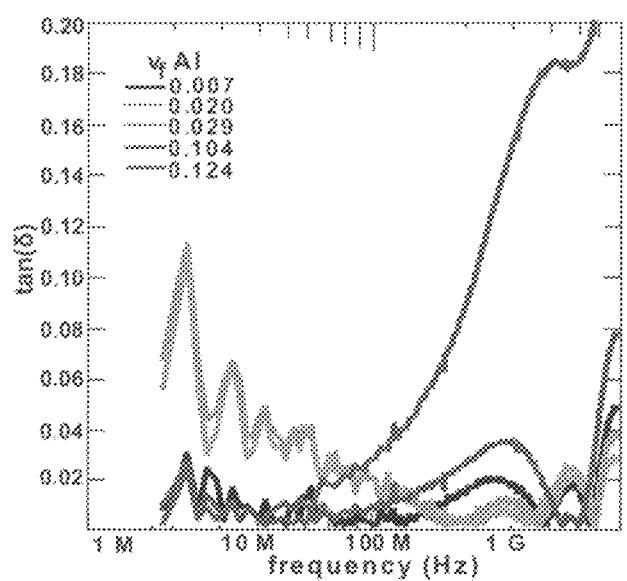

FIG. 16. Graph showing tan δ of Al-$^{iso}$PP nanocomposites as a function of nanoparticle volume fraction from 100 MHz-7 GHz.

Figure 17:
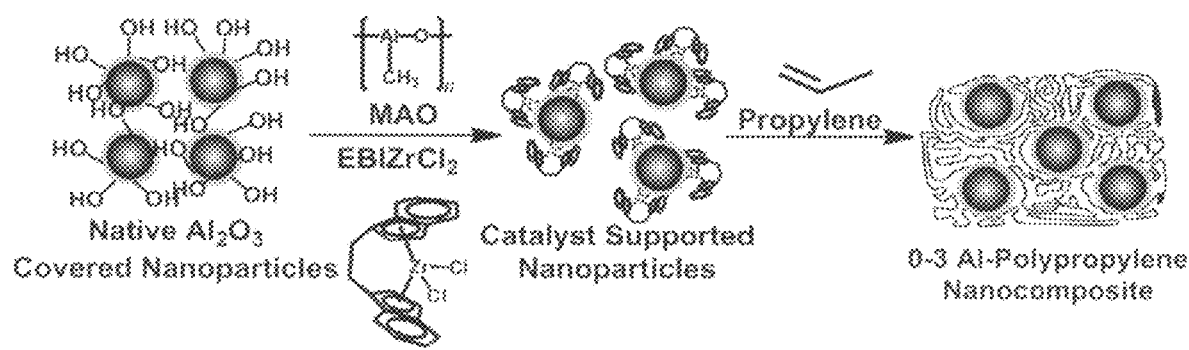

FIG. 17. Representation of Al nanoparticle-polypropylene composite synthesis.

Figure 18:
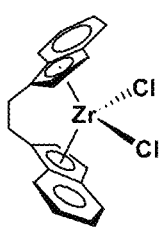
Figure 18:
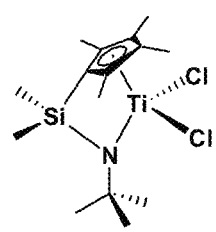
Figure 18:
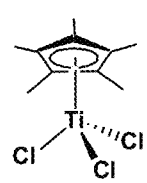
Figure 18:
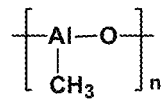

FIG. 18. Examples of metallocene polymerization catalysts.

Figure 19:
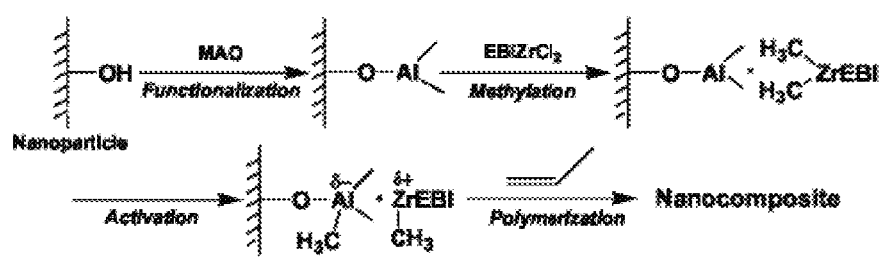
Figure 19:
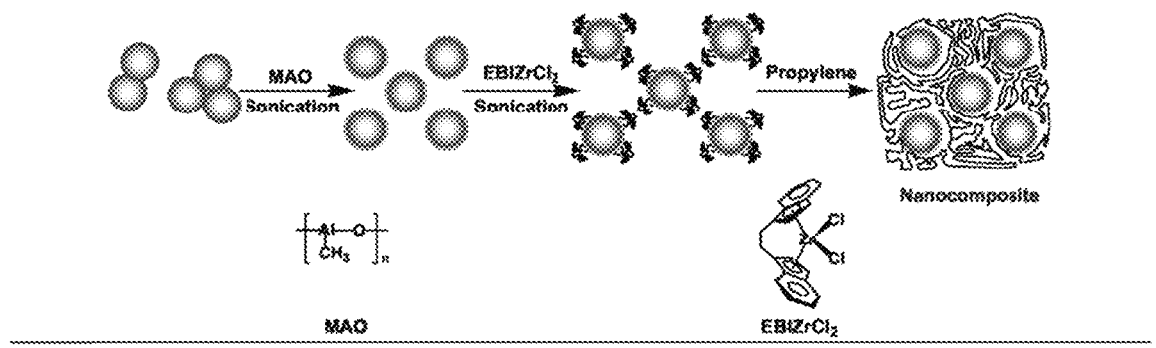

FIG. 19. Scheme 1. Synthesis of Isotactic Polypropylene-Metal Oxide Nanocomposites.

DETAILED DESCRIPTION OF CERTAIN EMBODIMENTS

Illustrating certain embodiments of this invention, high energy density $BaTiO_3$— and $TiO_2$-isotactic polypropylene nanocomposites were prepared via in situ metallocene polymerization. The resulting nanocomposites were found to have effective nanoparticle dispersion and to possess energy densities as high as 9.4 J/cm$^3$, as determined from relative permittivities and dielectric breakdown measurements. To demonstrate various other aspects of this invention, the scope of inorganic inclusion can be extended to include a broad variety of nanoparticles, with corresponding effects of nanoparticle identity and shape on the electrical/dielectric properties of the resulting nanocomposites. Likewise, the scope of metallocene polymerization catalysts and olefinic monomers can be extended (e.g., Chart 1, FIG. 18) to enhance nanoparticle processability and thermal stability. Representative of a range such of embodiments, nanoparticle coating with methylaluminoxane (MAO) and subsequent in situ polymerization can be used effectively for effective dispersion, to realize high breakdown strengths, permittivities and energy storage densities.

Accordingly, a series of 0-3 metal oxide-polyolefin nanocomposites was synthesized via in situ olefin polymerization using the metallocene catalysts $C_2$-symmetric dichloro[rac-ethylenebisindenyl]zirconium(IV) (EBIZrCl$_2$), Me$_2$Si($^t$BuN)(η$^5$-C$_5$Me$_4$)TiCl$_2$ (CGCTiCl$_2$), and (η$^5$-C$_5$Me$_5$)TiCl$_3$ (Cp*TiCl$_3$) immobilized on methylaluminoxane (MAO)-treated barium titanate (BaTiO$_3$), zirconium dioxide (ZrO$_2$), 3 mol % yttria-stabilized zirconia (TZ3Y), 8 mol % yttria-stabilized zirconia (TZ8Y), sphere-shaped titanium dioxide (TiO$_2$), and rod-shaped TiO$_2$ nanoparticles. The resulting composite materials were characterized by X-ray diffraction (XRD), scanning electron microscopy (SEM), transmission electron microscopy (TEM), $^{13}$C nuclear magnetic resonance (NMR) spectroscopy, and differential scanning calorimetry (DSC). It was shown by TEM that the nanoparticles are well-dispersed in the polymer matrix and each individual nanoparticle is surrounded by polymer. Electrical measurements reveal that most of the nanocomposites have leakage current densities ~$10^{-8}$-$10^{-6}$ A/cm$^2$, and the relative permittivities of the nanocomposites increase as the nanoparticle volume fraction increases, with measured values as high as 6.1. At the same volume fraction, rod-shaped TiO$_2$ nanoparticle-polypropylene nanocomposites exhibit greater relative permittivities than the corresponding sphere-shaped TiO$_2$ nanoparticle-polypropylene nanocomposites. The energy densities of these nanocomposites are estimated to be as high as 9.4 J/cm$^3$.

In another embodiment, metal nanoparticle-polyolefin composites were prepared by chemisorbing a metallocene precatalyst, for example [rac-ethylenebisindenyl]zirconium dichloride (EBIZrCl$_2$), onto a native oxide of Al nanoparticles. Addition of a methylaluminoxane (MAO) co-catalyst then activated the adsorbed EBIZrCl$_2$ for in situ synthesis of isotatic polypropylene. Capacitors were then fabricated with films of these materials for dielectric characterization. As seen in other ceramic composites fabricated using the in situ polymerization method, the present composite films have no discernible voids and the transmission electron microscopy (TEM) and scanning electron microscopy (SEM) images of the films indicate uniform morphologies (FIG. 14). The native Al$_2$O$_3$ coating on the particles is ~2 nm thick as confirmed by TEM. It is noted that this oxide thickness is comparable to that of a single Al$_2$O$_3$ layer derived from exposing methylaluminoxide (MAO) to air, and is thin enough that the volume fraction of Al metal in the samples is equivalent to the volume fraction of nanofiller.

In yet another embodiment, and depending upon polyolefin and/or substrate component identity, a composition according to the invention can be present as a thin film. Thin film capacitors as produced by the instant invention can be used in diverse high frequency electronic applications ranging from signal coupling, filtering, and impedance matching to advanced packaging applications.

As one of the most commonly used polymers in large-scale power capacitors, isotactic polypropylene offers greater stiffness, lower shrinkage, and less deterioration of the dielectric properties at higher temperatures than other grade polypropylenes. Therefore, the C$_2$-symmetric metallocene catalyst dichloro[rac-ethylenebisindenyl]zirconium (IV) (EBIZrCl$_2$), known for highly isospecific olefin polymerization, was selected to demonstrate immobilization on the surfaces of MAO-treated metal oxide nanoparticles, to synthesize metal oxide-isotactic polypropylene nanocomposites. X-ray diffraction (XRD) linewidth analyses using the Scherrer equation indicate that the microstructures and coherence lengths of the individual nanoparticles remain largely unchanged upon deagglomeration (Table 1). (See, Jenkins, R.; Snyder, R. L. In *Introduction to X-ray Powder Diffractometry*; Winefordner, J. D., Ed.; Wiley: New York, 1996; pp 89-91; and Scherrer, P. *Gött. Nachr.* 1918, 2, 98-100.) $^{13}$C NMR spectroscopy (FIG. 1) shows that the present polypropylenes are highly isotactic, as evidenced by the isotacticity index ([mmmm]=83%). (See, Busico, V.; Cipullo, R.; Monaco, G.; Vacatello, M. *Macromolecules* 1997, 30, 6251-6263; Busico, V.; Cipullo, R.; Corradini, P.; Landriani, L.; Vacatello, M.; Segre, A. L. *Macromolecules* 1995, 28, 1887-1892; and Zambelli, A.; Dorman, D. E.; Brewster, A. I. R.; Bovey, F. A. *Macromolecules* 1973, 6, 925-926.) DSC confirms the absence of extensive amorphous regions in the composites since only isotactic polypropylene melting features (142-147° C.) are detected. XRD data for the nanocomposites also reveal the presence of monoclinic α phase crystalline isotactic polypropylene (2θ=14.2, 17.0, 18.6, and 21.8°). It is found that the melting temperatures of the nanocomposites generally increase as the nanoparticle loading increases (Table 2), possibly due to attractive interactions between the nanoparticles and the crystalline regions of the isotactic polypropylene.

TABLE 1

XRD Linewidth Analysis Results of the Nanocomposites

| Powder | 2θ (deg) | FWHM (deg) | Crystallite Size (nm) |
|---|---|---|---|
| BaTiO$_3$-polypropylene | 31.649 | 0.271 | 32.8 |
| BaTiO$_3$ | 31.412 | 0.254 | 35.6 |
| TiO$_2$-polypropylene | 25.358 | 0.361 | 23.5 |
| TiO$_2$ | 25.360 | 0.317 | 27.1 |

Crystallite size (L) is calculated using the Scherrer equation L = 0.9λ/Bcosθ$_B$ (λ = x-ray wavelength, B = full-width-at-half maximum (FWHM) of the diffraction peak, and θ$_B$ = Bragg angle).

Linear low-density polyethylene (LLDPE) is another polymer that is widely used in power capacitors. Compared to isotactic polypropylene, the chain branching in the LLDPE affords better processability. Therefore, the sterically open constrained geometry catalyst Me$_2$Si($^t$BuN)(η$^5$-C$_5$Me$_4$)TiCl$_2$ (CGCTiCl$_2$) was utilized to synthesize BaTiO$_3$-LLDPE nanocomposites via in situ ethylene+1-octene copolymerization. FIG. 2 presents a representative $^{13}$C NMR spectrum of the nanocomposite, with the 1-octene incorporation level calculated to be 25.0 mol %. (See, Qiu, X.; Redwine, D.; Gobbi, G.; Nuamthanom, A.; Rinaldi, P. L. *Macromolecules* 2007, 40, ASAP.) DSC measurements also confirms the formation of LLDPE, which has a typical melting temperature of 125.3° C.

Syndiotactic polystyrene has greater heat resistance than isotactic polypropylene, which can only operate below 85° C. when incorporated into film capacitors. Employing the same protocol as EBIZrCl$_2$, the half-metallocene catalyst Cp*TiCl$_3$[25] was immobilized on MAO-treated ZrO$_2$ nanoparticles. Subsequent in situ styrene polymerization affords ZrO$_2$-syndiotactic polystyrene nanocomposites. A representative $^{13}$C NMR spectrum is shown in FIG. 3. The characteristic single resonance near δ=145.6 ppm for the ipso phenyl carbon atom confirms the production of syndiotactic polystyrene, which is further substantiated by the melting temperature (267.0° C.) as measured by DSC.

During the course of in situ metallocene polymerization, the polymer chains propagating at the nanoparticle-immobilized metallocene catalytic centers may be expected to create large local hydrostatic pressures and thus help to disrupt the nanoparticle agglomeration. Such results are confirmed by the comparative electron microscopic characterization of the as-received pristine nanoparticles and the resulting nanocomposites. As can be seen from FIGS. 4, 5, and 6, the as-received pristine nanoparticles evidence very high levels of agglomeration, however, for the polyolefin nanocomposites, the agglomeration of the nanoparticles is shown to be disrupted and each individual nanoparticle is surrounded by a layer of matrix polymer.

To assess nanocomposite permittivity properties, metal-insulator-metal (MIM) or metal-insulator-semiconductor (MIS) devices for nanocomposite electrical measurements were fabricated by first doctor-blading nanocomposite films onto aluminum or n$^+$-Si substrates, followed by vacuum-depositing top gold electrodes through shadow masks. The capacitances were measured at 1 kHz, a sufficiently high frequency to avoid the complications arising from conduction and interfacial polarization effects. After the capacitance was measured at multiple locations on the nanocomposite film surface using different electrode areas, the relative permittivity ($\varepsilon_r$) of the nanocomposite was derived using eq. 2, where C is the capacitance, A is the electrode area, $$C = \frac{\varepsilon_0 \varepsilon_r A}{d} \quad (2)$$

$\varepsilon_0$ is the vacuum permittivity (8.8542×10$^{-12}$ F/m), $\varepsilon_r$ is relative permittivity, and d is the nanocomposite film thickness. FIG. 7 shows a representative capacitance vs. electrode area plot, the linearity of which indicates the good dielectric uniformity of the nanocomposite film.

Table 2 summarizes the relative permittivity measurement results for the present nanocomposites. As the nanoparticle loading increases, the relative permittivity of the nanocomposites also increases as predicted by the effective medium approximation. At the same volume fraction, rod-shaped TiO$_2$-polypropylene nanocomposites exhibit significantly greater relative permittivities than those prepared with sphere-shaped TiO$_2$ nanoparticles (compare entries 1-4 versus 11-13) under identical reaction conditions. Without limitation, this shape effect is thought to arise from the different depolarization factors for different inclusion particle geometries.

TABLE 2

Electrical Characterization Results for Metal Oxide-polypropylene Nanocomposites[a]

| Entry | Composite | Nanoparticle vol %[b] | T$_m^c$ (° C.) | Permittivity[d] | Breakdown Field (kV) | Film Thickness[e] (μm) | Energy Density[f] (J/cm$^3$) |
|---|---|---|---|---|---|---|---|
| 1 | $^{iso}$PP-$^s$TiO$_2$ | 0.1% | 135.2 | 2.2 ± 0.1 | >10.0 | 36 | >0.8 ± 0.1 |
| 2 | $^{iso}$PP-$^s$TiO$_2$ | 1.6% | 142.4 | 2.8 ± 0.2 | 9.5 | 23 | 2.1 ± 0.2 |
| 3 | $^{iso}$PP-$^s$TiO$_2$ | 3.1% | 142.6 | 2.8 ± 0.1 | 7.5 | 27 | 1.0 ± 0.1 |
| 4 | $^{iso}$PP-$^s$TiO$_2$ | 6.2% | 144.8 | 3.0 ± 0.2 | 9.3 | 20 | 2.8 ± 0.2 |
| 5 | $^{iso}$PP-BaTiO$_3$ | 0.5% | 136.8 | 2.7 ± 0.1 | 8.8 | 28 | 1.2 ± 0.1 |
| 6 | $^{iso}$PP-BaTiO$_3$ | 0.9% | 142.8 | 3.1 ± 1.2 | >10.0 | 21 | >4.0 ± 0.6 |
| 7 | $^{iso}$PP-BaTiO$_3$ | 2.6% | 142.1 | 2.7 ± 0.2 | 9.8 | 25 | 1.8 ± 0.2 |
| 8 | $^{iso}$PP-BaTiO$_3$ | 5.2% | 145.6 | 2.9 ± 1.0 | 8.2 | 30 | 1.0 ± 0.3 |
| 9 | $^{iso}$PP-BaTiO$_3$ | 6.7% | 144.8 | 5.1 ± 1.7 | 9.0 | 22 | 3.7 ± 1.2 |
| 10 | $^{iso}$PP-BaTiO$_3$ | 13.6% | 144.8 | 6.1 ± 0.9 | >10.0 | 17 | >9.4 ± 1.3 |
| 11 | $^{iso}$PP-$^r$TiO$_2$ | 1.4% | 139.7 | 3.4 ± 0.3 | | | |
| 12 | $^{iso}$PP-$^r$TiO$_2$ | 3.2% | 142.4 | 4.1 ± 0.7 | | | |
| 13 | $^{iso}$PP-$^r$TiO$_2$ | 5.1% | 143.7 | 4.9 ± 0.4 | | | |
| 14 | $^{iso}$PP-ZrO$_2$ | 1.6% | 142.9 | 1.7 ± 0.3 | | | |
| 15 | $^{iso}$PP-ZrO$_2$ | 3.9% | 145.2 | 2.0 ± 0.4 | | | |
| 16 | $^{iso}$PP-ZrO$_2$ | 7.5% | 144.9 | 4.8 ± 1.1 | | | |
| 17 | $^{iso}$PP-ZrO$_2$ | 9.4% | 144.4 | 5.1 ± 1.3 | | | |

TABLE 2-continued

Electrical Characterization Results for Metal Oxide-polypropylene Nanocomposites[a]

| Entry | Composite | Nanoparticle vol %[b] | $T_m$[c] (° C.) | Permittivity[d] | Breakdown Field (kV) | Film Thickness[e] (μm) | Energy Density[f] (J/cm$^3$) |
|---|---|---|---|---|---|---|---|
| 18 | [iso]PP-TZ3Y | 1.1% | 142.9 | 1.1 ± 0.1 | | | |
| 19 | [iso]PP-TZ3Y | 3.1% | 143.5 | 1.8 ± 0.2 | | | |
| 20 | [iso]PP-TZ3Y | 4.3% | 143.8 | 2.0 ± 0.2 | | | |
| 21 | [iso]PP-TZ3Y | 6.7% | 144.9 | 2.7 ± 0.2 | | | |
| 22 | [iso]PP-TZ8Y | 0.9% | 142.9 | 1.4 ± 0.1 | | | |
| 23 | [iso]PP-TZ8Y | 2.9% | 143.2 | 1.8 ± 0.1 | | | |
| 24 | [iso]PP-TZ8Y | 3.8% | 143.2 | 2.0 ± 0.2 | | | |
| 25 | [iso]PP-TZ8Y | 6.6% | 146.2 | 2.4 ± 0.4 | | | |

[a]Polymerizations carried out in 50 mL of toluene under 1.0 atm of propylene at 20° C.
[b]From elemental analysis.
[c]From differential scanning calorimetry.
[d]Derived from capacitance measurement.
[e]Film thicknesses measured using profilometry.
[f]Energy density (U) calculated from $U = 0.5\varepsilon_0\varepsilon_r E_b^2$ ($\varepsilon_0$, vacuum permittivity; $\varepsilon_r$, relative permittivity; and $E_b$, breakdown field (MV/cm) calculated by dividing breakdown voltage by film thickness).

The leakage current densities of all the nanocomposite films prepared in this investigation (FIGS. 8 and 9) are mostly within the range $10^{-8}$-$10^{-6}$ A/cm$^2$ at 100 V, indicating that the aforementioned nanocomposites are all excellent insulators. As the nanoparticle loading increases, most of the nanocomposites exhibit lower leakage current densities, presumably a result of modified charge transport and interruption of the crystalline conduction pathways within the composite structure. However, at the highest nanoparticle loadings, the nanocomposites have the largest leakage current densities, simply because the weight percentages of the nanoparticles have reached the respective percolation thresholds. Increasing the relative permittivity of the nanocomposite by changing the shape of the inclusion does not appear to compromise the good insulating properties of these composites.

The present measured breakdown strengths for some of the nanocomposites are invariably ~3-6 MV/cm, indicating that metal oxide nanoparticle inclusion does not significantly depress the polymer dielectric breakdown strength. Without limitation, in a well-dispersed nanoparticle composite, interfaces between the ceramic nanoparticles and polymer phases can create effective electron scatterers and trapping centers, thus reducing the breakdown probability. Moreover, well-dispersed ceramic nanoparticles may block degradation tree growth and can increase the long-term breakdown strength. Energy densities of the present nanocomposites are estimated to be as high as 9.4 J/cm$^3$, which rivals or exceeds those reported for conventional ceramic, polymer, and composite dielectrics.

A challenge in the preparation of inorganic metal oxide-polyolefin nanocomposites is the general phase incompatibility between inorganic polar metal oxide inclusions and the non-polar organic host materials. For example, ferroelectric metal oxides are highly hydrophilic, while isotactic polypropylene is highly hydrophobic. Simple admixing of the two constituents negligibly disrupts the extensive nanoparticle agglomeration nor affects the urn-scale or larger phase separation, which can lead to local dielectric breakdown and degrade the nanocomposite electrical properties. In contrast, the present in situ supported metallocene polymerization approach minimizes these deficiencies by achieving homogeneous nanoscale dispersion of the metal oxide phase: each individual nanoparticle is surrounded by polymer chains propagating in situ from the surface-immobilized metallocenium catalyst centers, and thus offers improved dielectric properties (energy densities as high as 9.4 J/cm$^3$).

However, such nanocomposites can have very large contrasts in relative permittivities between host and guest materials, leading to a large disparity in the electric fields within the constituent phases, thus preventing the realization of maximum energy densities for both constituents simultaneously. For representative BaTiO$_3$-polypropylene nanocomposites, however, the achieved energy density is as high as 9.4 J/cm$^3$ although the materials permittivity ratio approaches ~1000:1. Without limitation to any one theory or mode of operation, the Al$_2$O$_3$ ($\varepsilon_r \approx 10$) layer (thickness ~1 nm, estimated from ICP-OES analysis) evolving from ambient exposure of the MAO coating, can act as a dielectric buffer layer between the high permittivity BaTiO$_3$ nanoparticles ($\varepsilon_r \approx 2000$) and low permittivity polypropylene ($\varepsilon_r \approx 2.2$).

As discussed above, the aforementioned in situ synthetic approach was also applied to metallic nanoparticles having a native metal oxide coating. As a non-limiting example thereof, metallic aluminum nanoparticles are coated with a metal oxide coating, such as, for example, Al$_2$O$_3$, wherein the oxide coating is, for example, 2 nm thick (see FIG. 17). It was found that the complex permittivity of the metallic Al particles affords composites with high permittivities, up to ~15 at 100 Hz, and significant recoverable energy storage of up to ~14 J/cm$^3$. These composites maintain permittivities greater than 10 up to 1 MHz, with only the highest Al volume fraction (0.12) material exhibiting significant relaxation in the 100 Hz to 1 MHz range. While Al is specifically mentioned, it will be understood that other metal nanoparticles other than aluminum can be employed to produce similar results.

With regard to characterizing the aluminum nanoparticle materials prepared according to the invention, the frequency dependence of permittivities is conventionally measured using dielectric relaxation spectroscopy (DRS) which probes the interaction of the sample with a time-dependent electric field. The resulting polarization, expressed by the frequency-dependent complex permittivity (here by the real permittivity and tan δ), characterizes the amplitude and timescale of charge density fluctuations across the sample. Such fluctuations generally arise from electronic polarization, or more significantly, the reorientation of permanent molecular dipole moments, of nanoparticles or of dipolar moieties appended to polymers. Other possible mechanisms include ion transport or the reorganization of interfacial charge in heterogeneous systems, with the timescale of the fluctuations depending on the material and the relevant relaxation mechanism. Relaxation timescales range from psec in low-viscosity liquids to hours in glasses, with the corresponding frequencies encompassing 0.1 mHz-1 THz, (FIG. 12). In FIG. 12, the frequencies shown are typical of homogenous materials reported in the literature, with the type of relaxation and approximate characteristic frequency indicated.

Since in all polarization mechanisms (except those at optical frequencies arising from electronic polarization) the dipolar response to an oscillating field involves displacement of masses, inertia constrains arbitrarily rapid movements. Two physical parameters describe the movement of the charged masses in response to alternating fields, polarization response and relaxation. Response can be modeled kinematically and relaxation describes the decay of polarization from excited states to the ground state. For every response mechanism operative in a material, the polarization decays below certain limiting frequencies above which the dipole can no longer reorient with the speed of the fluctuating field. As noted above, each response type has a characteristic relaxation frequency as shown in FIG. 12. While relaxation frequencies are typically in the GHz region, electronic polarization responds to very high frequencies (optical, ~1000 THz) and limits the index of refraction $$(n \approx \sqrt{\varepsilon_r}).$$

In contrast, interfacial polarization often decays at low frequencies (sometimes <1 MHz) and ionic polarization has resonances between GHz and optical frequencies. Maxwell-Wagner-Sillars polarization is the interfacial polarization between the internal dielectric boundary layers in a material, and generally occurs between the (slower) macroscopic interfacial relaxation at the electrode-dielectric layer interface and the (faster) orientational relaxation in the GHz range. While both Maxwell-Wagner-Sillars (MWS) polarization and macroscopic interfacial polarization are due to the reorganization of charges at surfaces, MWS polarization contributes orders of magnitude less to the permittivity than does the electrode interface polarization due to the microscopic nature of the internal dielectric surfaces. However, MWS also exhibits polarization response until much higher frequencies because there are far fewer charges that must reorganize in the oscillating field, resulting in lower reorganization energies and potential faster reorganization times.

As described herein, the frequency response of the aforementioned Al-polypropylene nanocomposites are analyzed between 200 MHz and 7 GHz to understand the types of dielectric relaxation operative in the present metallic nanocomposites. From Maxwell-Wagner-Sillars modeling, it is appears that conductive particle aggregation leads to strong dielectric relaxation, where increasing aggregate size depresses the relaxation frequencies. Mixing approaches such as percolation theory, which accurately predict permittivities for typical nanocomposites at low frequencies, argue that higher volume fractions of extremely high permittivity nanoparticles ($\varepsilon_r$>2000) lead to aggregates (e.g., chains) of particles that behave like single particles (at least for transport). For ferroelectric materials, such particle chains are thought to exhibit a combined dipole moment which responds to the field, resulting in dipolar polarization. In contrast, conductive particle surfaces instead accumulate charge at interfaces with the matrix, which effectively thin the dielectric layer and cause additional interfacial MWS polarization (FIG. 13). These internal interfacial polarizations can be a major component of the dielectric response of the material and are highly sensitive to the orientation and alignment of the charge accumulation surfaces. MWS modeling offers a means to quantify the loss and frequency dependence of this polarization. Using geometrical arguments based on the conductive particle shape and orientation, MWS theory predicts that at high metallic nanoparticle volume fractions, above the percolation threshold ($v_f$=0.16), particle aggregation will significantly lower the relaxation frequency. Accordingly, it is shown that above ~0.10 volume fraction and to about 0.125 volume fraction, Al-polypropylene nanocomposites have relatively high permittivities that are sustainable up to at least 5 GHz, and that composites with high Al volume fractions undergo relaxation at lower frequencies than their lower volume fraction counterparts.

The complex reflection (both magnitude, $\Gamma$, and phase, $\theta$) for aluminum nanocomposite capacitors was measured using lumped impedance methods. From the magnitude and phase of the complex reflection, the dielectric permittivities (eq. 3) of the thick films can be calculated. Here w is the radial frequency, $C_o=A\varepsilon_0/d$, wherein A is the area, d is the thickness of the sample, and $Z_o$ the characteristic impedance of a lossless transmission line (50Ω).

$$\varepsilon_r' = \frac{2\Gamma\sin\theta}{\omega C_o Z_o(\Gamma^2 + 2\Gamma\cos\theta + 1)} \quad (3)$$

nanocomposites as a function of composition from 200 MHz to 7 GHz. For the lowest volume fraction Al nanocomposites (0.007-0.029), the high frequency permittivities are statistically indistinguishable and ~2. This is consistent both with the low measured permittivities at lower frequencies and the fact that these samples have very little MWS polarization but instead are expected to have dielectric relaxation dominated by optical relaxations which occur at frequencies higher than 7 GHz. The 0.104 volume fraction composite has a permittivity ~10 at 1 MHz but experiences a relaxation between 1 and 200 MHz, and the dielectric permittivity falls to ~6 by 200 MHz, and falls further as 7 GHz is approached. The permittivity of the 0.124 composite begins to undergo a dielectric relaxation before 1 M decreases by ~50% between 1 and 200 MHz and appears to have another relaxation near 5 GHz. Nevertheless, it maintains a permittivity >5 at frequencies between 200 MHz and 5 GHz. The observed relaxations in the hundreds of MHz are most likely a result of MWS interfacial relaxations while the relaxations in the GHz range may also be orientational polarization relaxations from the polymer matrix. In polymer films, typical orientational relaxations arise from dipolar groups attached to the backbone and small oscillations of the chain geometries, especially reorientation of chain ends.

It is seen that while the 0.104 and 0.124 volume fraction Al nanocomposites undergo a dielectric relaxation and permittivity decrease of almost 50% between 1 and 200 MHz, they maintain relatively large permittivities (~6) in the 1 MHz-7 Ghz range, and preferably in the 200 MHz-7 GHz range. It is also noted that these materials appear to undergo another relaxation around 5-7 GHz. Relatively frequency-insensitive, high permittivities in the GHz range make these composites ideal candidates for high frequency dielectric applications. The ceramic particle counterparts to these composites all have permittivities below 2 by 100 MHz and common radio frequency dielectrics have permittivities on the order of 3-4.

The value of tan δ is the imaginary part divided by the real part of the permittivity (tan δ=ε"/ε').

$$\varepsilon_r'' = \frac{1-\Gamma^2}{\omega C_o Z_o (\Gamma^2 + 2\Gamma\cos\theta + 1)} \quad (4)$$

By calculating both the real part (eq 3) and the imaginary part (eq 4) of the permittivity from the measured complex reflection, tan δ is obtained (FIG. 16). Because the present lumped impedance technique measures the permittivity via a reflection method, there is some noise in the derived imaginary part of the permittivity, which introduces tan δ noise due to the very high measured magnitude of the reflection, Γ. The loss, tan δ, is proportional to the difference between the reflection magnitude of the sample and perfect reflection (100%). Lumped impedance measurements are typically limited to higher loss systems, however, since the measured tan δ here is greater than 0.02, this is not a major concern. However, overall these composites have relatively low loss, since up to 7 GHz the loss remains below 0.20.

As expected from the trends in permittivity, the tan δ of the 0.124 volume fraction Al nanocomposite begins to rise dramatically around 1 GHz, resulting in the permittivity fall evident in FIG. 15. For both the 0.104 and 0.124 volume fraction materials, the permittivity data suggest a dielectric relaxation in the MHz range, but since the accuracy of the tan δ data in this region does not allow extraction of the exact frequency of this relaxation, the maximum in tan δ is not well-determined. Such GHz frequency relaxations seen in the high volume fraction polymer composites are most often attributed to orientational relaxation such as rotation of dipolar groups around bonds, chain twisting or libration. In ordered polymers lacking dipolar groups as in isotatic polypropylene, such polarizations have been assigned to chain end rotation, and therefore this relaxation is a fairly small fraction of the total response. Because the polypropylene is grown in situ on the nanoparticle surfaces, the higher volume fraction nanocomposites should have greater surface areas, hence higher chain end densities, and hence greater contributions from reorientational polarization processes, likely enhancing the relaxation processes observed at >3 GHz. Nevertheless, the 0.10 of Al-$^{iso}$P nanocomposite is the most useful material for GHz range capacitor applications since the permittivity of ~6 is maintained above 5 GHz.

The most common effective medium models for permittivity are derived for the simple case of a spherical dielectric inclusion embedded in a sphere of the host material. However, most materials do not occur naturally as spheres, and therefore effective medium models for other shapes have also been developed. (See, e.g., Brosseau, C.; Beroual, A.; Boudida, A. *J. Appl. Phys.* 2000, 88, 7278-7288; Green, N. G.; Jones, T. B. *J. Phys. D: Appl. Phys.* 2007, 40, 78-85.) Simple analytical solutions for the effective permittivity ($\varepsilon_{eff}$) can be derived only for ellipsoids, whereas all other shapes require numerical solutions. Depolarization factors along each semi-axis of the ellipsoid ($N_x$, $N_y$, $N_z$), where $N_x=N_y=N_z=1$, can be used to estimate geometrical effects. The depolarization factors are calculated from integrals, e.g., eq. 5, where $a_x$, $a_y$, $a_z$ are the semi-axes of the ellipsoid. For spheres, all three $$N_x = \frac{a_x a_y a_z}{2} \int_0^\infty \frac{1}{(s+a_x^2)\sqrt{(s+a_x^2)(s+a_y^2)(s+a_z^2)}} ds \quad (5)$$

depolarization factors are equal (⅓, ⅓, ⅓), however, for ellipsoids the depolarization factors are, 0, ½, ½, respectively and for discs, 1, 0, 0, respectively. Since the dielectric energy is a stationary functional of the electric field, the result is that permittivities arising from spherical inclusions are the lowest and any deviation from the spherical shape results in an increase in the effective permittivity of the mixture at the same volume fraction. These observations prompted study of TiO$_2$-isotactic polypropylene nanocomposites with different inclusion shapes.

In FIG. 10, the calculated effective permittivities of the nanocomposites containing spherical inclusions to the nanocomposites are compared with ellipsoidal inclusions. For the case of spherical inclusions, the effective permittivities are calculated using the Maxwell-Garnett effective medium theory (eq. 6), and for the case of ellipsoidal inclusions, $$\varepsilon_{eff} = \varepsilon_b \frac{\varepsilon_a + 2\varepsilon_b + 2f_a(\varepsilon_a - \varepsilon_b)}{\varepsilon_a + 2\varepsilon_b - f_a(\varepsilon_a - \varepsilon_b)} \quad (6)$$

$$\varepsilon_{eff} = \varepsilon_b + \frac{f_a}{3}(\varepsilon_a - \varepsilon_b) \sum_{j=x,y,z} \frac{\varepsilon_{eff}}{\varepsilon_{eff} + N_j(\varepsilon_a - \varepsilon_{eff})} \quad (7)$$

the effective permittivities are calculated using the Polder-Van Santen formalism (eq. 7), where $\varepsilon_a$ is the relative permittivity of the TiO$_2$ inclusions, $\varepsilon_b$ is the relative permittivity of isotactic polypropylene, $f_a$ is the volume fraction of TiO$_2$ in the polymer, and $N_j$ is for the depolarization factors. (See, e,g., Busico, V.; Cipullo, R.; Monaco, G.; Vacatello, M. *Macromolecules* 1997, 30, 6251-6263.) As expected, the effective medium theory predicts that composites containing ellipsoidal inclusions will have larger effective permittivities at low volume loadings than composites containing spherical inclusions.

The experimental results are plotted in FIG. 11. Remarkably, the effective permittivities for spherical inclusions remain constant over a small range of volume fractions, exactly as the Maxwell-Garnett equation predicts (FIG. 10). In marked contrast, the effective permittivity of composites having inclusions with ellipsoidal shapes increases rapidly with increasing inclusion volume fraction, which is again similar to trend predicted for ellipsoidal inclusions using eq. 7 (FIG. 10).

EXAMPLES OF THE INVENTION

Materials and Methods. All manipulations of air-sensitive materials were performed with rigorous exclusion of oxygen and moisture in flamed Schlenk-type glassware on a dual-manifold Schlenk line or interfaced to a high-vacuum line ($10^{-5}$ Torr), or in a dinitrogen-filled Vacuum Atmospheres glove box with a high capacity recirculator (<1 ppm O$_2$ and H$_2$O). Propylene (Matheson, polymerization grade) was purified by passage through a supported MnO oxygen-removal column and an activated Davison 4 Å molecular sieve column. Toluene was dried using an activated alumina column and Q-5 columns according to the method described in literature, and was additionally vacuum-transferred from Na/K alloy and stored in Teflon-valve sealed bulbs for polymerization manipulations. BaTiO$_3$ and TiO$_2$ nanoparticles were kindly provided by Prof. Fatih Dogan (University of Missouri, Rolla) and Prof. Thomas Shrout (Penn State University), respectively. $ZrO_2$ nanoparticles were purchased from Aldrich. The reagents 3 mol % yttria-stabilized zirconia (TZ3Y) and 8 mol % yttria-stabilized zirconia (TZ8Y) nanoparticles were purchased from Tosoh, Inc. $TiO_2$ nanorods were purchased from Reade Advanced Materials, Riverside, R.I. All of the nanoparticles were dried on a high vacuum line ($10^{-5}$ Torr) at 80° C. overnight to remove the surface-bound water, known to adversely affect the dielectric breakdown performance. The deuterated solvent 1,1,2,2-tetrachloroethane-$d_2$ was purchased from Cambridge Isotope Laboratories (≥99 atom % D) and used as received. Methylaluminoxane (MAO; Aldrich) was purified by removing all the volatiles in vacuo from a 1.0 M solution in toluene. The reagent dichloro[rac-ethylenebisindenyl]zirconium (IV) ($EBIZrCl_2$) was purchased from Aldrich and used as received. $n^+$-Si wafers (rms roughness≈0.5 nm) were obtained from Montco Silicon Tech (Spring City, Pa.) and cleaned according to standard procedures. Aluminum substrates were purchased from McMaster-Carr (Chicago, Ill.) and cleaned according to standard procedures.

Physical and Analytical Measurements. NMR spectra were recorded on a Varian Innova 400 (FT 400 MHz, $^1H$; 100 MHz, $^{13}C$) spectrometer. Chemical shifts (δ) for $^{13}C$ spectra were referenced using internal solvent resonances and are reported relative to tetramethylsilane. $^{13}C$ NMR assays of polymer microstructure were conducted in 1,1,2,2-tetrachloroethane-$d_2$ containing 0.05 M $Cr(acac)_3$ at 130° C. Resonances were assigned according to the literature for stereoregular polypropylenes. Elemental analyses were performed by Midwest Microlabs, LLC, Indianapolis, Ind. Inductively coupled plasma-optical emission spectroscopy (ICP-OES) analyses were performed by Galbraith Laboratories, Inc., Knoxville, Tenn. The thickness of the dielectric film was measured with a Tencor P-10 step profilometer and used to calculate the dielectric constant and breakdown strength of the sample. X-ray powder diffraction patterns were recorded on a Rigaku DMAX-A diffractometer with Ni-filtered Cu Kα radiation (1.54184 Å). Pristine ceramic nanoparticles and composite microstructures were examined with a FEI Quanta sFEG environmental scanning electron microscope with an accelerating voltage of 30 kV. Transmission electron microscopy was performed on a Hitachi H-8100 TEM with an accelerating voltage of 200 kV. Composite melting temperatures were measured on a TA Instruments 2920 temperature modulated differential scanning calorimeter. Typically, ca. 10 mg samples were examined, and a ramp rate of 10° C./min was used to measure the melting point. To erase thermal history effects, all samples were subjected to two melt-freeze cycles. The data from the second melt-freeze cycle are presented here.

Electrical Measurements. Gold electrodes for metal-insulator-semiconductor (MIS) devices were vacuum-deposited through shadow masks at $(3-4)\times10^{-6}$ Torr (500 Å, 0.2-0.5 Å/s). Direct current MIS leakage current measurements were performed using Keithley 6430 sub-femtoamp remote source meter and a Keithley 2400 source meter using a locally written LABVIEW program and general purpose interface bus communication. A digital capacitance meter (Model 3000, GLK Instruments, San Diego) was used for capacitance measurements. All measurements were performed under ambient conditions. Dielectric breakdown strength measurements were carried out with a high-voltage amplifier (TREK 30/20A, TREK, Inc., Medina, N.Y.), and the experimental parameters were: ramp rate, 1,000 V/S; peak voltage, 30,000 V; ext. amplifer, 3,000; temperature, room temperature.

With reference to the following representative examples, any metal oxide component, metallocene catalyst component, aluminoxane component and olefin monomer component of the sort described herein can be used interchangeably with any one of the other. Accordingly, the general procedures of examples 1-2 were used to prepare the range of nanocomposites referenced in conjunction with the corresponding figures, such procedures as can be modified by those skilled in the art made aware of this invention. As such, the embodiments of example 3 were also prepared using such procedures (corresponding figures and data not shown).

Example 1

Representative immobilization of Metallocene Catalysts on Metal Oxide Nanoparticles. In the glovebox, 2.0 g nanoparticles, 200 mg MAO, and 50 mL dry toluene were loaded into a predried 100 mL Schlenk flask. Upon stirring, the mixture turned into a very fine slurry. The slurry was next subjected to alternating sonication and vigorous stirring for 2 days with constant removal of evolving $CH_4$. Next, the nanoparticles were collected by filtration and washed with fresh toluene (50 mL×4) to remove any residual MAO. Then, 200 mg metallocene catalyst was loaded in the flask with 50 mL toluene. The color of the nanoparticles immediately turned purple. The slurry mixture was again subjected to alternating sonication and vigorous stirring overnight. The nanoparticles were then collected by filtration and washed with fresh toluene until the color of the toluene remained colorless. The nanoparticles were dried on the high-vacuum line overnight and stored in the glovebox at −40° C.

Example 2

Representative Synthesis of Nanocomposites via In Situ Propylene Polymerization. In the glovebox, a 250 mL round-bottom three-neck Morton flask, which had been dried at 160° C. overnight and equipped with a large magnetic stirring bar, was charged with 50 mL dry toluene, 200 mg functionalized nanoparticles, and 50 mg MAO. The assembled flask was removed from the glovebox and the contents were subjected to sonication for 30 min with vigorous stirring. The flask was then attached to a high vacuum line ($10^{-5}$ Torr), freeze-pump-thaw degassed, equilibrated at the desired reaction temperature using an external bath, and saturated with 1.0 atm (pressure control using a mercury bubbler) of rigorously purified propylene while vigorously stirring. After a measured time interval, the polymerization was quenched by the addition of 5 mL methanol, and the reaction mixture was then poured into 800 mL of methanol. The composite was allowed to fully precipitate overnight and was then collected by filtration, washed with fresh methanol, and dried on the high vacuum line overnight to constant weight.

Example 3

More specifically, with reference to the preceeding, $BaTiO_3$ and $TiO_2$ 40 nm nanoparticles were dried on a high-vacuum line to remove surface-bound water, known to adversely affect dielectric breakdown performance. Nanocomposites were then synthesized via sequential nanoparticle MAO functionalization, catalyst immobilization/activation, and in situ isotactic propylene polymerization (Schemes 1 and 2, FIG. 19). The first step is the anchoring MAO onto the nanoparticle surfaces via surface hydroxyl group reaction to form covalent Al—O bonds. Anchored MAO functions as a cocatalyst to activate the metallocene, and in addition, the hydrophobic MAO helps disrupt, in combination with ultrasonication, hydrophilic nanoparticle agglomeration in the hydrophobic reaction medium. After washing away unbound MAO, the MAO-coated nanoparticles are subjected to reaction with the $C_2$-symmetric polymerization catalyst EBIZrCl$_2$ to afford surface-anchored, polymerization-active species. EBIZrCl$_2$ is known to produce highly isotactic polypropylene, which, in conventional capacitors, affords enhanced mechanical and dielectric properties at elevated operating temperatures. Subsequent in situ polymerization yields isotactic polypropylene-BaTiO$_3$/TiO$_2$ nanocomposites, the compositions of which can be tuned by the polymerization conditions.

Example 4

Al (d=100 nm) nanoparticles with 2 nm native Al$_2$O$_3$ were purchased from Sigma-Aldrich. From the TEM it is clear that the particles range from about 50 nm to 150 nm in diameter. The nanoparticles were dried on a high vacuum line ($10^{-5}$ Torr) at 80° C. overnight to remove the surface-bound water. The reagent [rac-ethylenebisindenyl]zirconium dichloride was purchased from Sigma-Aldrich and used as received. MAO, 10% solution in toluene, was also purchased from Sigma-Aldrich and purified by removing the volatiles in vacuo. All manipulations of air-sensitive materials were performed with rigorous exclusion of O$_2$ and moisture using Schlenk techniques, or a high-vacuum line ($10^{-6}$ Torr), or a N$_2$-filled MBraun glove box with a high capacity recirculator (<1 ppm O$_2$ and H$_2$O). Propylene (Matheson, polymerization grade) was purified by passage through a supported MnO O$_2$-removal column and an activated Davison 4 A molecular sieve column. Toluene was dried using an activated alumina column and Q-5 columns, and is then vacuum-transferred from Na/K alloy and stored in Teflon-valve sealed bulbs.

In the glovebox, 2.0 g of nanoparticles, 200 mg of the metallocene precatalyst EBIZrCl$_2$ and 50 mL of toluene were loaded into a predried 200 mL flip-frit flask. The color of the particle suspension turned to light orange. The slurry mixture was subjected to alternating sonication and vigorous stirring overnight. The particles were then collected by filtration and washed with fresh toluene until the color of the toluene remained colorless. The particles were dried on the high-vacuum line overnight and stored in the glovebox at −40° C. in the dark.

In the glovebox, a 250 mL round-bottom three-neck Morton flask, equipped with a large magnetic stirring bar, was charged with 50 mL of dry toluene, 200 mg of the above catalyst-functionalized nanoparticles, and 50 mg of MAO. The assembled flask was removed from the glovebox and the mixture was subjected to sonication and vigorous stirring for 30 min. The flask was then attached to a high vacuum line ($10^{-5}$ Torr), the catalyst slurry was degassed, equilibrated at the desired reaction temperature using an external water bath, and saturated with 1.0 atm (pressure control using a mercury bubbler) of rigorously purified propylene while vigorously stirring. After a measured time interval (changing the interval results in different particle loadings), the polymerization was quenched by the addition of 5 mL of methanol, and the reaction mixture was then poured into 800 mL of methanol. The composite was allowed to fully precipitate overnight and was then collected by filtration, washed with fresh methanol, and dried on the high vacuum line at 80° C. overnight to constant weight.

Elemental analyses were performed by Midwest Microlabs, LLC, Indianapolis, Ind. Inductively coupled plasma-optical emission spectroscopy (ICP-OES) analyses were performed by Galbraith Laboratories, Inc., Knoxville, Tenn.

Example 5

Films with diameters between 3 and 7 mm are required. To obtain films that are robust to tearing at these diameters, relatively thick films were fabricated. The films were fabricated by slowly pressing the nanocomposite samples, that were heated slowly in a crucible until the composite powder was viscous (maximum surface temperature of crucible and composite was 100° C.), into the openings of small metal or PET washers, 3 mm in diameter and 1 mm thick. The thick films were then pressed with additional composite powder using a hot press at 100° C. and 500-800 psi pressure. The pressing helps create the smoothest electrode-dielectric interface possible. Postpressing vacuum treatment at 80° C. was then performed overnight to remove any residual moisture and trapped air bubbles. Next, parallel-plate capacitors were fabricated by vapor-depositing gold electrodes on the dielectric nanocomposite films. Gold electrodes for metal insulator metal (MIM) devices were vacuum deposited through shadow masks at $(3-4) \times 10^{-7}$ Torr (500 Å, 0.2-1.0 Å/s). The films were then removed from the washers by either cutting away the PET washer or boring the sample out of the metal washer.

The thicknesses of the films were measured with calipers and used to calculate the dielectric permittivity and tan δ. Film topography and RMS roughnesses were imaged using a JEOL SPM atomic force microscope. The thick films had rms roughnesses of 3-4 nm. Low frequency (1 MHz) capacitance was measured on an HP 4384A precision meter.

High frequency capacitance was measured using a lumped impedance method on an HP 8510 network analyzer whose sample holder terminated in an APC7 connector. This connector was fitted with the "shorted coaxial cable" sample holder. Each 3 mm thick film sample was placed directly on the center of the APC7 and then enclosed in the sample holder. The sample holder was fitted with an electrode at the end of a movable plunger which is brought into contact with the upper film surface by tightening the feed screw. In this configuration the sample holder inductance is minimized. To measure the high frequency capacitance, a lumped impedance method of measuring the complex reflection coefficient (both magnitude, F, and phase, θ) is utilized. By placing a thick sample (~1 mm) at the end of the coaxial line, the reflection coefficient of the impedance transported down the line can be measured. Before measuring an unknown capacitor, a calibration was performed by attaching known standards (short, open, and load) to the end of the coaxial line.

As demonstrated, the present invention provides a range of well-dispersed metal oxide-polyolefin nanocomposites via a scalable, in situ supported metallocene olefin polymerization process. Leakage current densities $\sim 10^{-8}$-$10^{-6}$ A/cm$^2$ suggest that the nanocomposites are excellent insulators. The relative permittivity of the nanocomposites increases as the nanoparticle fraction increases. At the same inclusion loading, rod-shaped TiO$_2$ nanoparticle-polypropylene nanocomposites exhibit significantly greater relative permittivities than sphere-shaped TiO$_2$ nanoparticle-polypropylene nanocomposites. Energy densities of the BaTiO$_3$- polypropylene nanocomposites are found to be as high as 9.4 J/cm$^3$. Energy densities of the Al$_2$O$_3$-polypropylene nanocomposites are found to be as high as about 14 J/cm$^3$. This versatile approach offers effective control over composite composition and ready scalability. That is, simply by varying nanoparticle identity as well as their sizes, shapes, and the metallocene catalysts used, a wide array of nanocomposites with desired dielectric and mechanical properties can thus be catalytically synthesized in situ.

We claim:

1. A solid nanoparticle composition comprising a substrate comprising a BaTiO$_3$ nanoparticle; a coating comprising an aluminoxane on the BaTiO$_3$ nanoparticle, and a metallocene olefin polymerization catalyst component immobilized on the BaTiO$_3$ nanoparticle.

2. The composition of claim 1 wherein said metallocene component is C$_2$-symmetric dichloro [rac-ethylenebisindenyl]zirconium (IV) (EBIZrCl$_2$).

3. The composition of claim 1 wherein the BaTiO$_3$ nanoparticles comprise a dopant.

4. The nanoparticle composition of claim 1, wherein the aluminoxane is methylaluminoxane.

5. A composite comprising:
a plurality of BaTiO$_3$ nanoparticles dispersed throughout a polyolefin matrix, the nanoparticles comprising:
a BaTiO$_3$ nanoparticle, a coating comprising an aluminoxane on the BaTiO$_3$ nanoparticle, and a metallocene catalyst component immobilized on the BaTiO$_3$ nanoparticle.

6. The composite of claim 5 wherein said polyolefin is selected from C$_2$ to about C$_{12}$ polyalkylenes, substituted C$_2$ to about C$_{12}$ polyalkylenes, and copolymers thereof.

7. The composite of claim 5 wherein said metallocene component is C$_2$-symmetric dichloro [rac-ethylenebisindenyl]zirconium (IV) (EBIZrCl$_2$).

8. The composite of claim 7 having an energy density up to about 9.4 J/cm$^3$.

9. The composite of claim 7 wherein the BaTiO$_3$ nanoparticle volume fraction in the composite is in the range from about 0.05 percent to about 15 percent.

10. The composite of claim 5 wherein said polyolefin is isotactic polypropylene.

11. The composite of claim 5 wherein said BaTiO$_3$ nanoparticle dispersion is substantially homogenous on a nanoscale dimension.

12. The composite of claim 5 presented as a film.

13. The composite of claim 5, wherein the aluminoxane is methylaluminoxane.

14. The composite of claim 5, wherein the polyolefin is linear polyethylene.

15. The composite of claim 5, wherein the polyolefin is polystyrene.

16. An energy storage device comprising a capacitor comprising the composite of claim 5 as an energy storage medium.

* * * * *